United States Patent
Shafiee et al.

(10) Patent No.: US 9,152,932 B2
(45) Date of Patent: Oct. 6, 2015

(54) WORK UNITS FOR CONTENT PROCESSING

(75) Inventors: Mohammad Reza Shafiee, Ridgefield, CT (US); Hongfang Li, Plano, TX (US); Wei Liu, Flower Mound, TX (US); Anurag Gupta, Lucknow (IN); Ashutosh K. Sureka, Irving, TX (US); Satya S. Raju, Flower Mound, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 661 days.

(21) Appl. No.: 12/970,994

(22) Filed: Dec. 17, 2010

(65) Prior Publication Data

US 2012/0158645 A1    Jun. 21, 2012

(51) Int. Cl.
*G06F 17/30* (2006.01)
*G06Q 10/06* (2012.01)

(52) U.S. Cl.
CPC ..................... *G06Q 10/06* (2013.01)

(58) Field of Classification Search
CPC ........................................ G06Q 10/06
USPC ........................................... 707/694
See application file for complete search history.

(56) References Cited

U.S. PATENT DOCUMENTS

| | | | |
|---|---|---|---|
| 5,941,983 A * | 8/1999 | Gupta et al. ................. | 712/214 |
| 7,904,481 B1 * | 3/2011 | Deka et al. ................... | 707/799 |
| 2007/0073626 A1 * | 3/2007 | Reeder et al. ................ | 705/59 |
| 2008/0231480 A1 * | 9/2008 | Lai et al. ..................... | 341/51 |

* cited by examiner

*Primary Examiner* — James Trujillo
*Assistant Examiner* — Kurt Mueller

(57) ABSTRACT

A system may create work units, each work unit including at least one of an input port or output port, each work unit configured to modify data that is received via the input port. In addition, the system may compose a workflow by connecting an output port of a first of the work units to an input port of a second of the work units, receive a work order, select the workflow in response to the work order, decompose the workflow into constituent work units, instantiate tasks that correspond to the constituent work units, and execute a work unit process for each of the tasks.

20 Claims, 12 Drawing Sheets

| WORK UNIT TYPES 1100 ||
|---|---|
| CREATE METADATA 1102 | SPLIT MEDIA 1126 |
| TRANSFORM METADATA 1104 | DISTRIBUTE 1128 |
| PULL METADATA 1106 | PACKAGE 1130 |
| PULL MEDIA 1108 | ENCRYPT 1132 |
| CONFIRM DELIVERY 1110 | DECRYPT 1134 |
| ENCODE 1112 | ARCHIVE 1136 |
| DECODE 1114 | SAVE 1138 |
| AD MARKER 1116 | RETRIEVE 1140 |
| CLOSE CAPTIONING 1118 | QUALITY ASSURANCE 1142 |
| BRANCH 1120 | MANUAL INTERVENTION 1144 |
| MERGE 1122 | REPORT 1146 |
| TRANSCODE 1124 | ASSEMBLY 1148 |

| CONFIGURATION MANAGER/WORK FLOW MANAGER 502/504 ||
|---|---|
| INSTALLING WORK UNIT 902 | GETTING WORK UNIT PARAMETERS 910 |
| CHANGING WORK UNIT STATE 904 | UPDATING WORK UNIT PARAMETERS 912 |
| GETTING WORK UNIT LIST 906 | RETROFITTING ACTIVE WORK UNIT 914 |
| GETTING WORK UNIT 908 | RETROFITTING SINGLE WORK UNIT 916 |

FIG. 9

| WORK UNIT TYPES 1100 ||
|---|---|
| CREATE METADATA 1102 | SPLIT MEDIA 1126 |
| TRANSFORM METADATA 1104 | DISTRIBUTE 1128 |
| PULL METADATA 1106 | PACKAGE 1130 |
| PULL MEDIA 1108 | ENCRYPT 1132 |
| CONFIRM DELIVERY 1110 | DECRYPT 1134 |
| ENCODE 1112 | ARCHIVE 1136 |
| DECODE 1114 | SAVE 1138 |
| AD MARKER 1116 | RETRIEVE 1140 |
| CLOSE CAPTIONING 1118 | QUALITY ASSURANCE 1142 |
| BRANCH 1120 | MANUAL INTERVENTION 1144 |
| MERGE 1122 | REPORT 1146 |
| TRANSCODE 1124 | ASSEMBLY 1148 |

FIG. 11

WORK UNITS FOR CONTENT PROCESSING

BACKGROUND

Consumer demand for media is increasing. For example, consumers often watch and/or listen to various media at home, while traveling, at work, etc. As a result, the number of communication channels for delivering media content and the number of different types of devices for playing the content has also increased.

BRIEF DESCRIPTION OF THE DRAWINGS

FIG. 9 is a list of exemplary operations that are associated with one or more work units;

FIG. 11 is a list of different types of exemplary work units; and

DETAILED DESCRIPTION

The following detailed description refers to the accompanying drawings. The same reference numbers in different drawings may identify the same or similar elements. As used herein, the term "content, " also referred to as assets, may refer to multimedia content (e.g., text-based content, audio, and video such as a movie, show, television program, broadcast of a live event (e.g., sporting event, concert, etc.)). As used herein, the term "work unit" may refer to a description of a set of one or more operations that a system may perform on content (e.g., overlaying subtitles on a video, inserting advertisements into a video, etc.).

As described herein, a digital data clearinghouse (DDC) may allow a user to define or create work units and use the work units to compose a workflow and, to dynamically provide for customer-requested processes for content distribution. When the user submits a service order for processing content on behalf of a customer, the DDC may obtain, from the workflow associated with the order, tasks that correspond to the work units. Furthermore, the DDC may perform all or some of these tasks.

For example, assume that a user (e.g., a DDC operator or administrator) defines two work units via the DDC. Also assume that the first work unit describes reformatting a M×N video into a 600×400 video, and the second work unit describes inserting an advertisement in the video. When a customer (e.g., a content creator/provider) places an order with the user, requesting that a video provided by the content creator/provider be formatted as a 600×400 video and an advertisement be inserted in the video, the user may compose, through a GUI provided via the DDC, a workflow, by concatenating two or more work units. When the user submits a work order, the DDC may schedule, for execution, a set of tasks that are associated with the work units included in the workflow. The DDC may perform the tasks.

Figure 1:
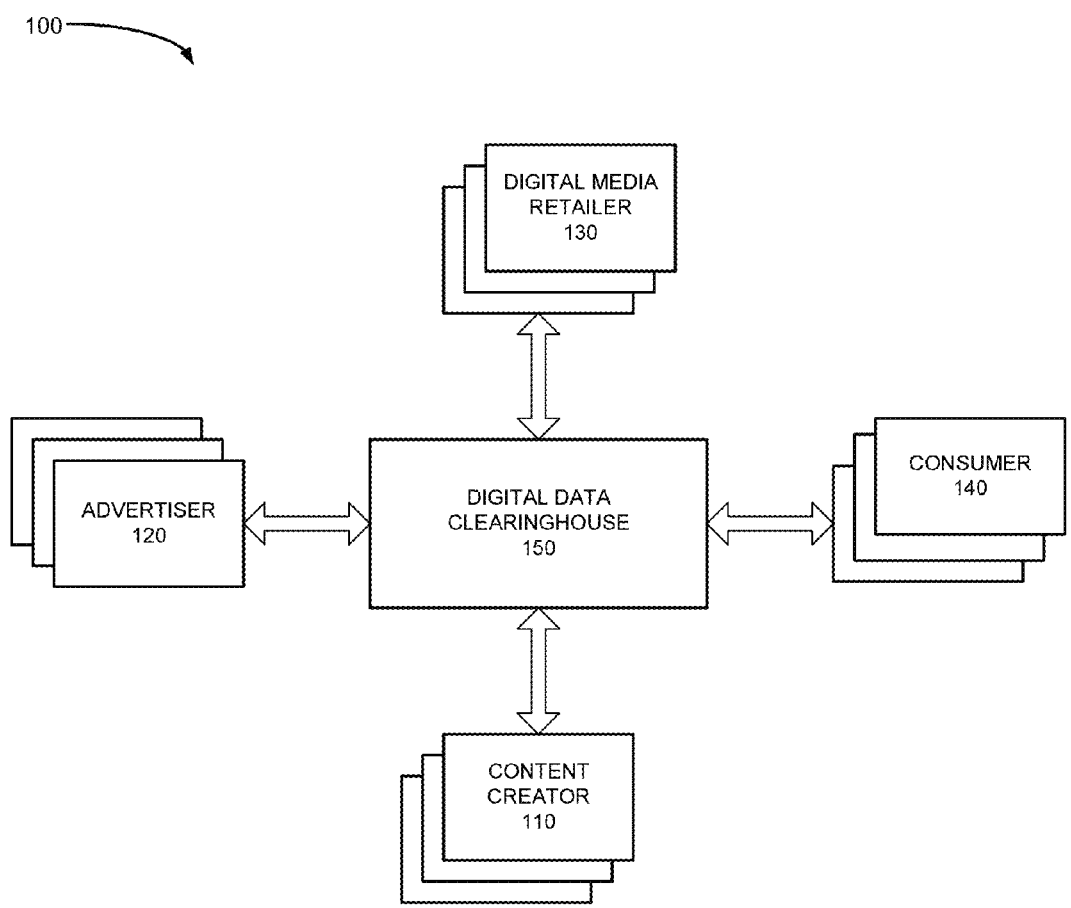
FIG. 1 schematically illustrates an exemplary system in which a digital distribution clearinghouse (DDC) may be implemented.

The preceding example is provided for simplicity. Descriptions below provide additional details with respect to work units and workflows in the context of the DDC. FIG. 1 is a block diagram of an exemplary system 100 in which the DDC may be implemented. Referring to FIG. 1, system 100 includes one or more content creators/providers 110, one or more advertisers 120, one or more digital media retailers (DMRs) 130, one or more consumers 140 and digital data clearinghouse (DDC) 150. The exemplary configuration illustrated in FIG. 1 is provided for simplicity. It should be understood that a typical system may include more or fewer components than illustrated in FIG. 1.

Content creator 110 (referred to collectively as content creators 110 or individually as content creator 110) may represent one or more creators of content that wish to package and/or distribute the content to other parties, such as consumers 140. For example, content creators 110 may include movie or television studios, music companies, publishers, game developers, parties who generate user generated content (UGC), websites, blogsites, etc. Content creators 110 may provide content to DDC 150 for formatting, packaging and/or distribution, as described in detail below.

Advertiser 120 (referred to collectively as advertisers 120 or individually as advertiser 120) may represent one or more parties that wish to insert advertising into media files. For example, advertiser 120 may contract with a content creator 110 and/or digital media retailer 130 to insert an advertisement into a media stream provided to consumers 140. DDC 150 may insert the advertisement into the stream in accordance with the agreement between the parties.

DMR 130 may represent one or more business entities that receive media content from various parties and resell it to end users. For example, DMRs 130 may include broadcasters, cable companies, direct broadcast satellite (DBS) providers, Internet protocol television (IPTV) providers, mobile phone TV providers, online retailers, etc. DMRs 130 may receive media content from DDC 150 and sell/provide the content to consumers 140.

Consumer 140 may represent one or more consumers 140 that receive content originally generated by or provided by content creators 110 and that has been processed by DDC 150. For example, DDC 150 may format and package content for distribution by DMRs 130 and/or DDC 150 to consumers 140.

DDC 150 may include a server/computing device or a set of servers/computing devices associated with, for example, processing media content. For example, as described briefly above, DDC 150, also referred to herein as DDC platform 150, may provide an automated environment in which content from content creators 110 is formatted and packaged for distribution in any number of formats, based on the particular requirements associated with DMRs 130. In an exemplary implementation, DDC 150 may also aggregate various data and insert advertisements into the media content. DDC 150, consistent with implementations described herein, may also utilize flexible workflows to streamline the formatting and packaging of content for digital distribution.

The exemplary configuration illustrated in FIG. 1 is provided for simplicity. For example, it should be understood that consumers 140 in system 100 may include advertisers 120 or content creators 110; system 100 may include additional DDCs; etc. Consequently, in an actual implementation, system 100 may include additional components than those illustrated in FIG. 1, with different content paths.

Figure 2:
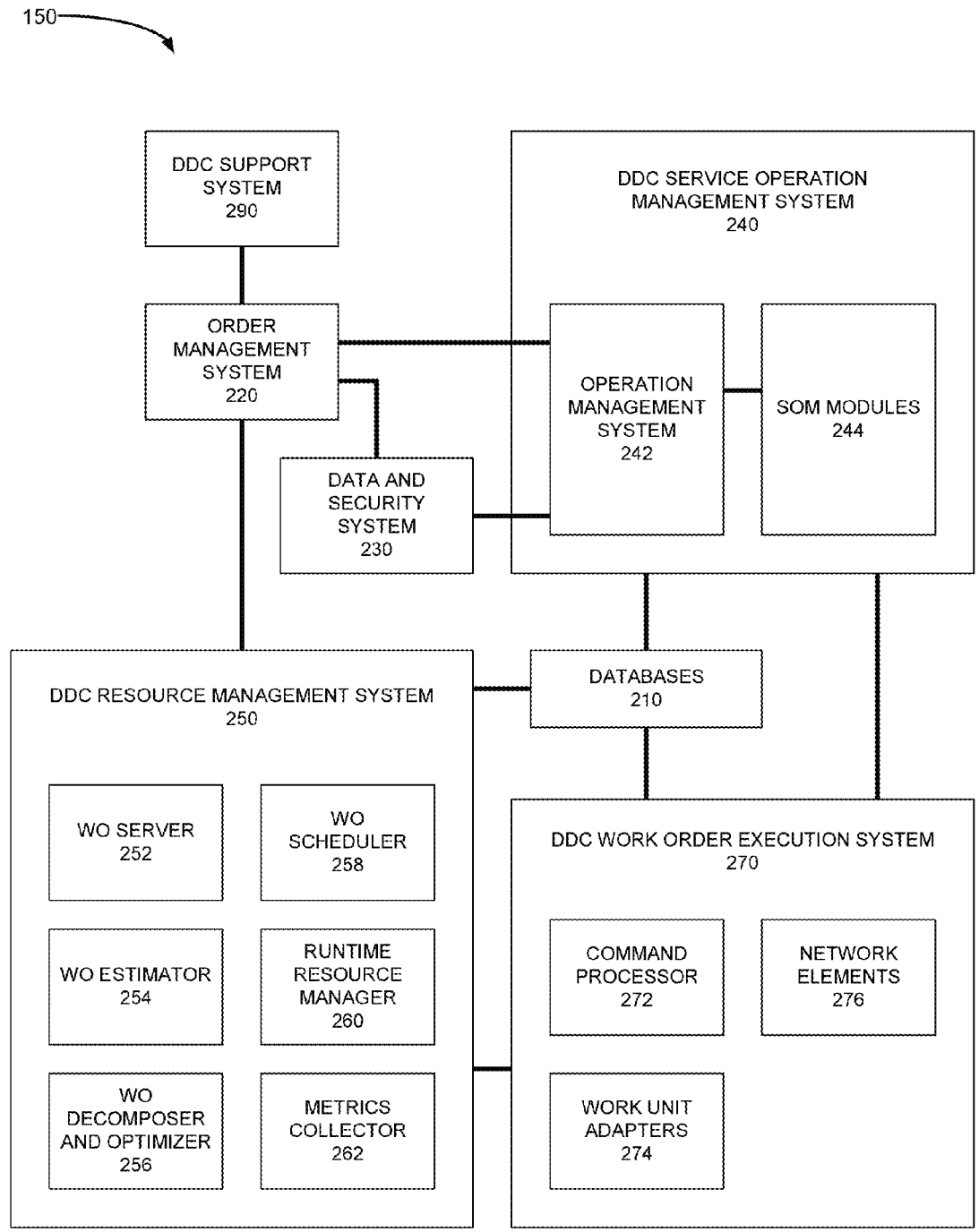
FIG. 2 illustrates an exemplary configuration of the DDC of FIG. 1.

FIG. 2 illustrates an exemplary configuration of DDC 150. Referring to FIG. 2, DDC 150 may include databases 210, order management system 220, data and security system 230, DDC service operation management system 240, DDC resource management system 250, DDC work order execution system 270 and DDC support system 290.

Databases 210 may store work unit definitions, workflows, parameters, tables that are associated with various components in DDC 150, intermediate or end results of processing performed by different processes in DDC 150, etc.

Order management system 220 may include devices for managing customer orders, generating reports, etc. In an exemplary implementation, order management system 220 may include client components that interface with components on DDC service operation management system 240. The client components (e.g., web browser) may receive customer orders, requests for reports, etc., and relay the received information to the components on DDC service operation management system 240 for the creation, validation, estimation, submission, approval, execution and reporting of activities associated with the customer orders, request for reports, etc. For example, a customer order may be completed by sending, to a component on DDC service operation management system 240, a selection of a particular workflow that will drive the processing of content associated with the order.

Data and security system 230 may include one or more devices to provide for authentication and authorization of users having roles in DDC 150 and/or for taking actions that are associated with the authorized roles (e.g., create user accounts, remove user accounts, generate an initial password, etc.). For example, when a user logs in as a DDC operator, the user may be authorized to design work units and/or compose workflows.

DDC service operation management (SOM) system 240 may include one or more devices to control an overall operation, configuration, and management of DDC 150. For example, DDC SOM system 240 may include operation management system 242 and SOM modules 244. Via a client component that communicates with operation management system 242, a user may control the configuration, administration and operation of DDC 150. For example, in one implementation, via a web browser or another client application, a user may control security, compose a workflow, administer accounts that are associated with content creator 110 or DMR 130, submit a work order, add data and storage to DDC 150, manage resources, manage DDC configuration (e.g., create a work unit), manage catalogs of content, run reports, monitor DDC work orders (e.g., information associated with a work order), etc.

In providing each of such services to a client, operation management system 242 may employ SOM modules 244. SOM modules 244 may include components/modules that correspond to the above-listed services. For example, the modules may include a security manager, workflow manager, account manager, work order manager, data and storage manager, resource management module, configuration manager, asset management module, catalog management module, monitoring and reporting module, etc.

DDC resource management system 250 may include one or more devices that support the capacity management of resources associated with network elements (NESs) in DDC 150. As illustrated in FIG. 2, DDC resource management system 250 may include work order (WO) server 252, WO estimator 254, WO decomposer and optimizer 256, WO scheduler 258, runtime resource manager 260, and metrics collector 262.

Depending on the embodiment, DDC resource management system 250 may implement additional, fewer, or different components than those illustrated in FIG. 2. For example, in one embodiment, DDC resource management system 250 may include a jeopardy manager to generate alarms when a rate of task processing falls below an acceptable threshold or will impact the target completion date/time. In another embodiment, DDC resource management system 250 may include a component for providing reports on resources, schedules, metrics, etc.

WO server 252 may provide work order-related interfaces to operation management system 242 and/or SOM modules 244, and may communicate with WO estimator 254, WO decomposer and optimizer 256, and WO scheduler 258 to submit, decompose, validate, and save work orders, and to estimate, schedule, and reserve resources during the order submission.

Work order estimator 254 may estimate the cost of completing a decomposed work order across work units of a workflow, based on resources that are associated with the work units for each resource type. Work order estimator 254 may store the cost in one of databases 210 in terms of resource capacity units (RCUs) and duration of time required to complete tasks or processes that are associated with the work order.

WO decomposer and optimizer 256 may break down an order into work units based on the workflow associated with the order. Furthermore, based on the decomposition, WO decomposer and optimizer 256 may generate work unit tasks, or simply "tasks," assign task parameters, and create task connectors, which are described below.

WO scheduler 258 may match cost estimates for different resource types for a work order to available time slots in an allocation schedule across different network elements (e.g., hardware/software components that perform underlying operations for a work unit). As a result of the scheduling, WO scheduler 258 may output start and end times for each of the work unit tasks and for resource reservations.

Runtime resource manager 260 may allocate network elements/user groups to a process at the time of execution on behalf of a work unit. Runtime resource manager 260 may attempt to honor scheduled reservations of resources. However, if the resources are unavailable, runtime resource manager 260 may attempt to obtain replacement resources.

Metrics collector 262 may determine, for each work unit, actual time of completion and used/consumed resources. Based on the measurements, metrics collector 262 may modify factors that are used to estimate the resource and time necessary to complete a task associated with a work unit.

DDC work order execution (WOE) system 270 may include one or more devices to manage the flow and execution of work units of a defined workflow associated with a work order. DDC WOE system 270 may include a command processor 272, work unit adapters 274, and network elements 276. For simplicity, FIG. 2 does not show other components of WOE system 270. Depending on the implementation, DDC WOE system 270 may include additional, fewer, or different components than those illustrated in FIG. 2.

Command processor 272 may drive work order execution. Command processor 272 may include a WO manager, WO processor, and work unit processor. The WO manager may provide interfaces to resource management system 250 for initiating an execution of a work order, retrieving the status of the work order, suspending/resuming the work order execution, canceling the work order, etc. The WO processor may coordinate work unit tasks for completion of a work order. In coordinating different work unit tasks, the WO processor may sequence the tasks for optimum execution time and resource utilization. The WO processor may communicate with runtime resource manager 260 for allocation and de-allocation of resources. The work unit processor may dispatch processes/threads to perform a work unit task.

Work unit adapter 274 may include interfaces for adapting network elements to perform media content processing corresponding to a work unit. In one implementation, each work unit adapter 274 may be versioned and may include Java code. Each work unit adapter 274 may monitor the corresponding network element to prevent over-allocation of the network element, maintain normal execution of logic associated with the network element, and provide real-time information to metrics collector 262.

Network elements 276 may include physical or logical network devices/components for processing media content.

DDC support system 290 may include one or more devices and/or personnel to provide support services, such creation of work units, composition of workflows, etc., billing support, contracting management, pricing, etc.

The configuration shown in FIG. 2 is for illustrative purposes. In other configurations and/or implementations, functions that are associated with one component or platform shown in FIG. 2 may be performed by one or more other components in FIG. 2; any of the components may be connected to any other of the components; and functions of one component may be included in another component. Accordingly, in the other configurations or implementations, DDC 150 may include additional, fewer, different, or a different arrangement of components than those illustrated in FIG. 2.

Figure 3:
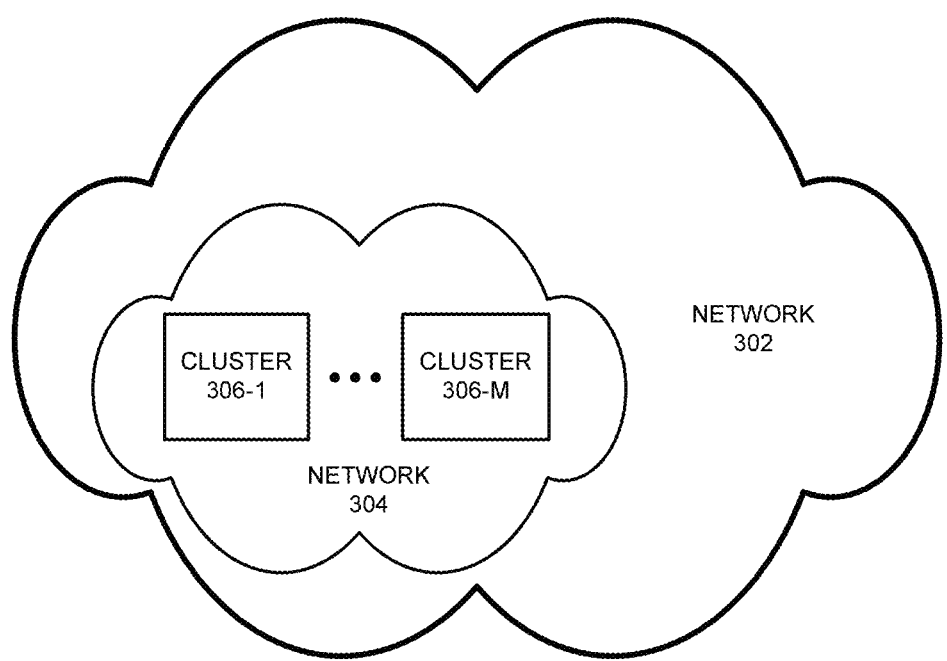
FIG. 3 illustrates an exemplary network in which the DDC of FIG. 2 may be implemented.

FIG. 3 illustrates an exemplary network 302 in which DDC 150 may be implemented. Network 302 may include one or more packet switched networks, such as an Internet protocol (IP) based network, a local area network (LAN), a wide area network (WAN), an intranet, the Internet, or another type of network that is capable of transmitting data. Network 302 may also include one or more public switched telephone networks (PSTNs) or other type of switched network. Network 302 may also include one or more wireless networks and may include a number of transmission towers for receiving wireless signals and forwarding the wireless signals toward the intended destination.

As shown, network 302 may include a local network 304, which may include an intranet, a demilitarized zone, clusters, wireless/wired network, etc. In FIG. 3, although network 304 may include different network elements, network 304 is illustrated as including a collection of clusters 306-1 through 306-M (individually cluster 306 and collectively clusters 306). Each cluster 306 may include one or more network devices on components/elements of DDC 150 may be implemented.

Figure 4:
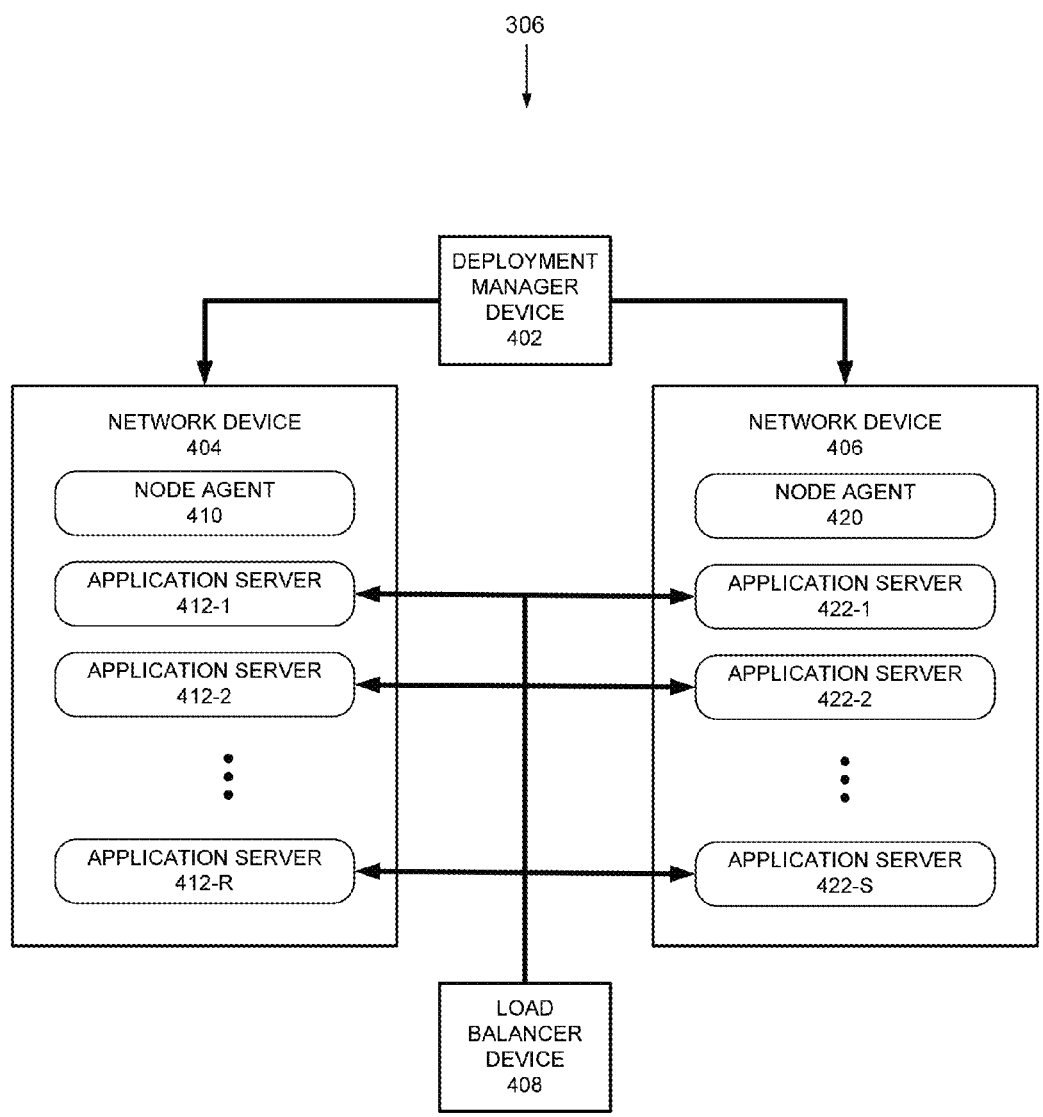
FIG. 4 is a block diagram of an exemplary cluster of FIG. 3.

FIG. 4 is a block diagram of an exemplary cluster 306. As shown, cluster 306 may include a deployment manager device 402, network devices 404 and 406, and load balancer device 408. Depending on the implementation, cluster 306 may include additional, fewer, or different devices than those illustrated in FIG. 4. For example, in one implementation, cluster 306 may include additional network devices. In another implementation, cluster 306 may include one network device and exclude load balancer device 408 and/or deployment manager device 402.

Deployment manager device 402 may install, update, and administer all or a number of DDC 150 components on network devices 404 and 406. For example, deployment manager device 402 may upgrade an application server 412 and components of DDC 150 on network device 404. In one implementation, deployment manager device 402 may also configure and/or set system parameters that are associated with running DDC 150, such as a shared memory size, a maximum number of system semaphores, etc.

Network device 404 may include node agent 410 and instances of application servers 412-1 through 412-R (individually application server 412 and collectively application servers 412). Node agent 410 may communicate with deployment manager device 402 when installing, updating, and/or administering DDC 150. Node agent 410 may include, for example, a secure telnet server/client, secure file transfer protocol (SFTP) client/server, web server, or a customized application for installation and/or administration of DDC 150. Application server 412 may include components for serving web documents and applications to a client application (e.g., browser). In some implementations, application server 412 may support a particular set of standard interfaces (e.g., Java Platform Enterprise Edition™).

Network device 406 may be configured similarly as network device 404.

Load balancer device 408 may send client requests for DDC services to one or more application servers 412/422 on network device 404/406. The client requests may include, for example, configuration/workflow management service requests (e.g., for creating a work unit, creating a workflow, saving a work unit, etc.) to operation management system 242. In response, operation management system 242 may provide for server-side components for rendering configuration/workflow management services (e.g., a session-specific application for creating a workflow).

Figure 5:
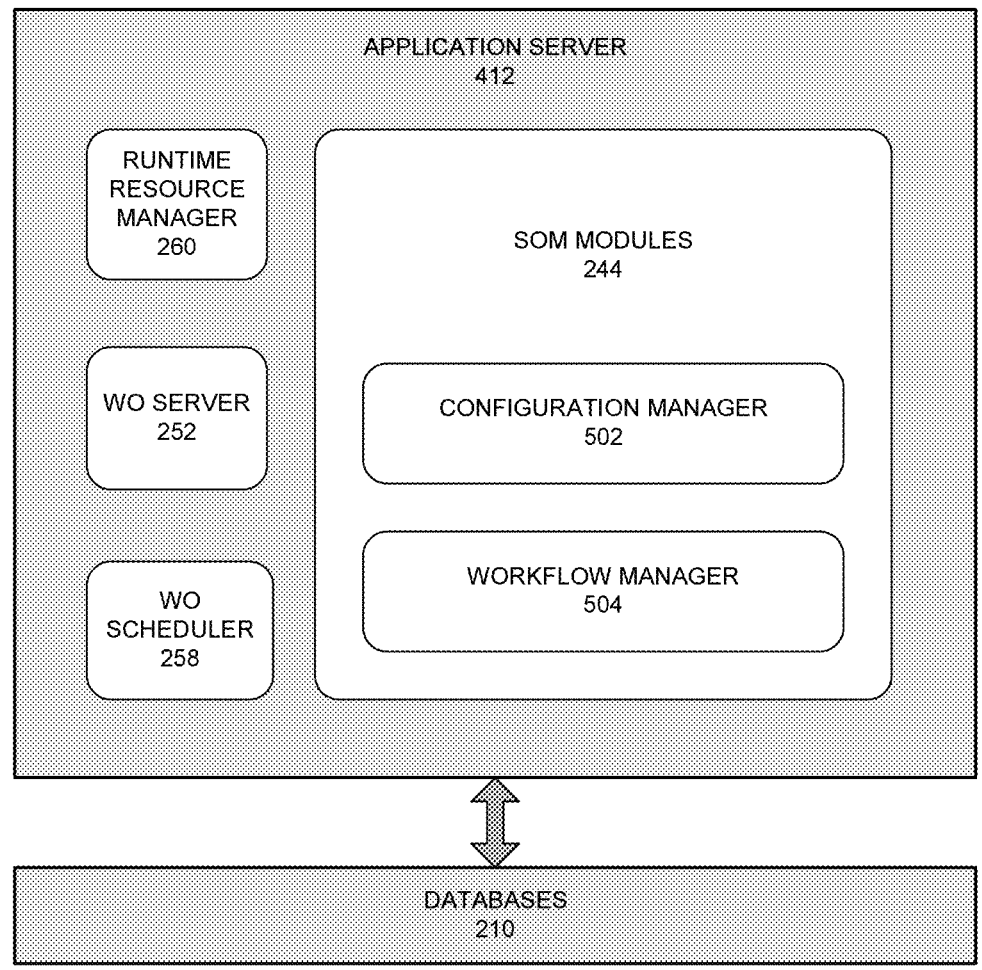
FIG. 5 is a block diagram of exemplary functional components of the application server of FIG. 4.

FIG. 5 is a block diagram of exemplary functional components of one of application servers 412. Although FIG. 5 shows a single application server 412 including a number of components, in other implementations, the components illustrated in FIG. 5 may be distributed over a number of application servers 412/422. In addition, DDC 150 may include a number of application servers 412/422, as illustrated in FIG. 4.

In FIG. 5, application server 412 may include runtime resource manager 260, WO server 252, WO scheduler 258, and SOM modules 244. Furthermore, in FIG. 5, SOM modules 244 are shown as including a configuration manager 502 and workflow manager 504. As described above, a user (e.g., a DDC operator) may create, edit, save, administer, etc., work units and workflow via configuration manager 502 and workflow manager 504. The user may interact with configuration manager 502 and workflow manager 504 via a client, such as a web browser. For example, the client may receive user input, and based on the user input, may initiate a chain of method calls (via different components in DDC 150) to request creation of a work unit by configuration manager 502.

Figure 6:
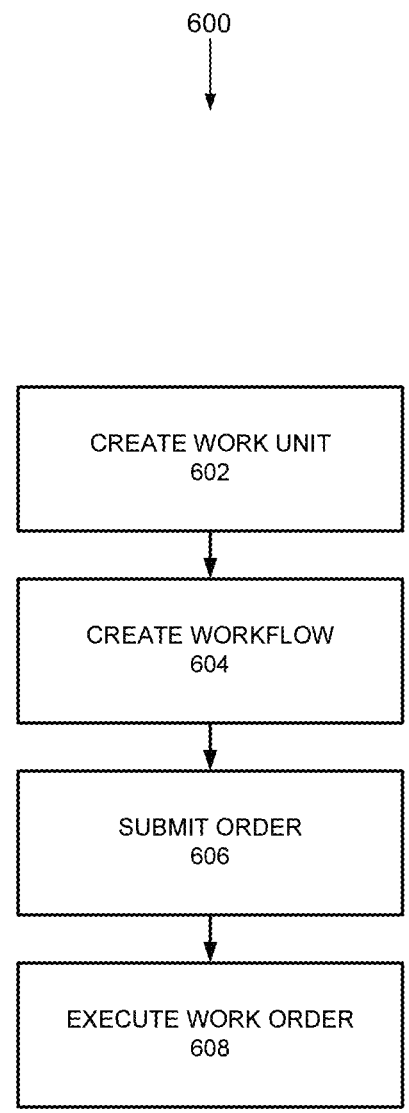
FIG. 6 is a flow diagram of an exemplary process that is associated with the components of FIG. 2 and FIG. 5.

FIG. 6 is a flow diagram of an exemplary process 600 that is associated with the components of FIG. 2 and FIG. 5. Process 600 may include operations or actions (shown in blocks) that may be performed by DDC 150 for processing content. Process 600 is described herein for illustrative purposes. In a different context, DDC 150 may perform other processes that include additional, fewer, or different operations than those shown in FIG. 6. For FIG. 6, assume that a customer (e.g., a content creator/provider) has an account with DDC 150. Also, assume that a DDC operator (e.g., a user) is administering DDC 150.

DDC 150 may create a work unit (block 602). For example, the DDC operator may construct a work unit via a client graphical user interface (GUI) communicating with configuration manager 502. In creating the work unit, the DDC operator may specify parameters that characterize the work unit.

Figure 7A:
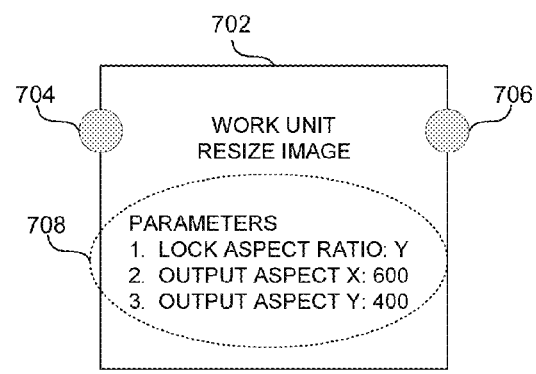
FIG. 7A is a block diagram of an exemplary work unit that is associated with the configuration manager of FIG. 5.

FIG. 7A is a block diagram of an exemplary work unit 702. As shown, work unit 702 may include an input connector point 704 (or an input port 704) and an output connector point 706 (or an output port 706) and parameters 708.

Input port 704 may represent the type of input that work unit 702 may receive. For example, work unit 702 may receive a 1024×768 video stream (not shown). Output port 706 may represent the type of output that work unit 702 may generate. For example, work unit 702 may generate 600×400 video, based on a 1024×768 input video. Other types of work units may include different types of input/output ports. For example, a work unit for packaging a video for distribution may include an input port for receiving metadata and another input port for receiving a video. The work unit may also include an output port for generating a packaged video (e.g., a video coupled to metadata).

Parameters 708 may include values that characterize work unit 702. For example, in FIG. 7A, parameters 708 include a flag indicating whether an aspect ratio of an output video is to be the same for all videos processed by work unit 702; a X-resolution of 600; and a Y-resolution of 400. The parameters may be stored in one or more databases 210. In addition, the parameters can be set up as system values that are not changeable, default values that are changeable, default values that require user verification, and parameters that require user entry.

A work unit may include additional and/or different configurations than those illustrated in FIG. 7A. Other parameters or characteristics of a work unit are described below with reference to FIG. 8.

Returning to FIG. 6, once one or more work units have been created, the work units may be used to compose a workflow. For example, when a customer signs up for services with DDC 150, DDC 150 may perform "on-boarding" operations. The on-boarding operations may include creating a new account for a content provider or a DMR via operation management system 242 and the account manager in SOM modules 244. The account creation may entail creating a new account record, setting up parameters, and composing new workflows using the work units (block 604).

For example, assume that the DDC operator has received a specification, from a customer, for transforming a 1024×768 video to a 600×400 video. Based on the specification, the DDC operator may assemble a workflow via workflow manager 504. The workflow may include work unit 702.

Figure 7B:
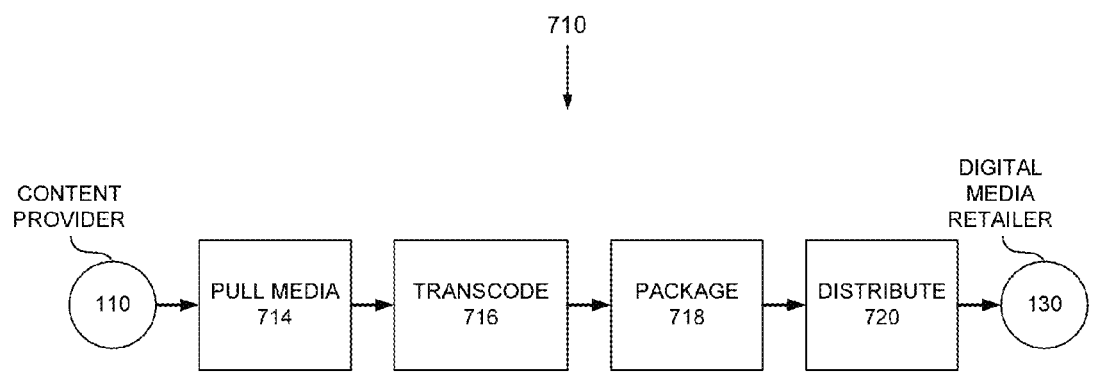
FIG. 7B is an exemplary workflow diagram.

FIG. 7B illustrates an exemplary workflow diagram 710. In one implementation, DDC 150 may display workflow diagrams at a GUI client via configuration manager 502. The DDC operator may edit and/or save such workflow diagrams. As shown in FIG. 7B, workflow diagram 710 includes a content creator/provider 110, pull media work unit 714, transcode work unit 716, package work unit 718, distribute work unit 720, and DMR 130. The functions of work units 714 through 720 are described below with reference to FIG. 10. Other workflow diagrams may include the same, additional, and/or different work units than the ones illustrated in FIG. 7B.

In workflow diagram 710, the input and output ports of work units 714 through 720 connect one work unit to another work unit. For example, the output port of pull media work unit 714 is connected to the input port of transcode work unit 716. Connecting work units 714-720 may form a processing path through which media content may "flow."

Returning to FIG. 6, once the workflow has been created, tested, and saved, the customer may place a request with DDC 150 to process content. Upon receiving the request, the DDC operator may log onto the customer account and select a workflow corresponding to the requested processing along with a set of parameters that are to be applied to the workflow.

Next, the DDC operator may submit an order with DDC 150, to process the content in accordance with the selected workflow (block 606). When operation management system 242 and the work order manager in SOM modules 244 relay the order to DDC resource management system 250, WO decomposer and optimizer 256 may convert each element of the workflow into a work unit task. In addition, for each connection between an input port of one work unit and an output port of another work unit, WO decomposer and optimizer 256 may create a "connector." A connector may include either memory or space in databases 210 to store data of the type specified by the output port, of a work unit, to which one end of the connection is coupled. When a process corresponding to the work unit places its output data in the connector (e.g., the memory or the space in database 210), another work unit whose input port is attached to the other end the connector may remove (e.g., "consume") the data from the connector and perform its own processing.

To DDC 150, when the submitted order has been reviewed and approved, the order becomes a work order that may be scheduled for execution by components in DDC resource management system 250 and executed by components in DDC work order execution system 270 (block 608). In databases 210, each work unit in the workflow is instantiated as a task to be performed.

Figure 8:
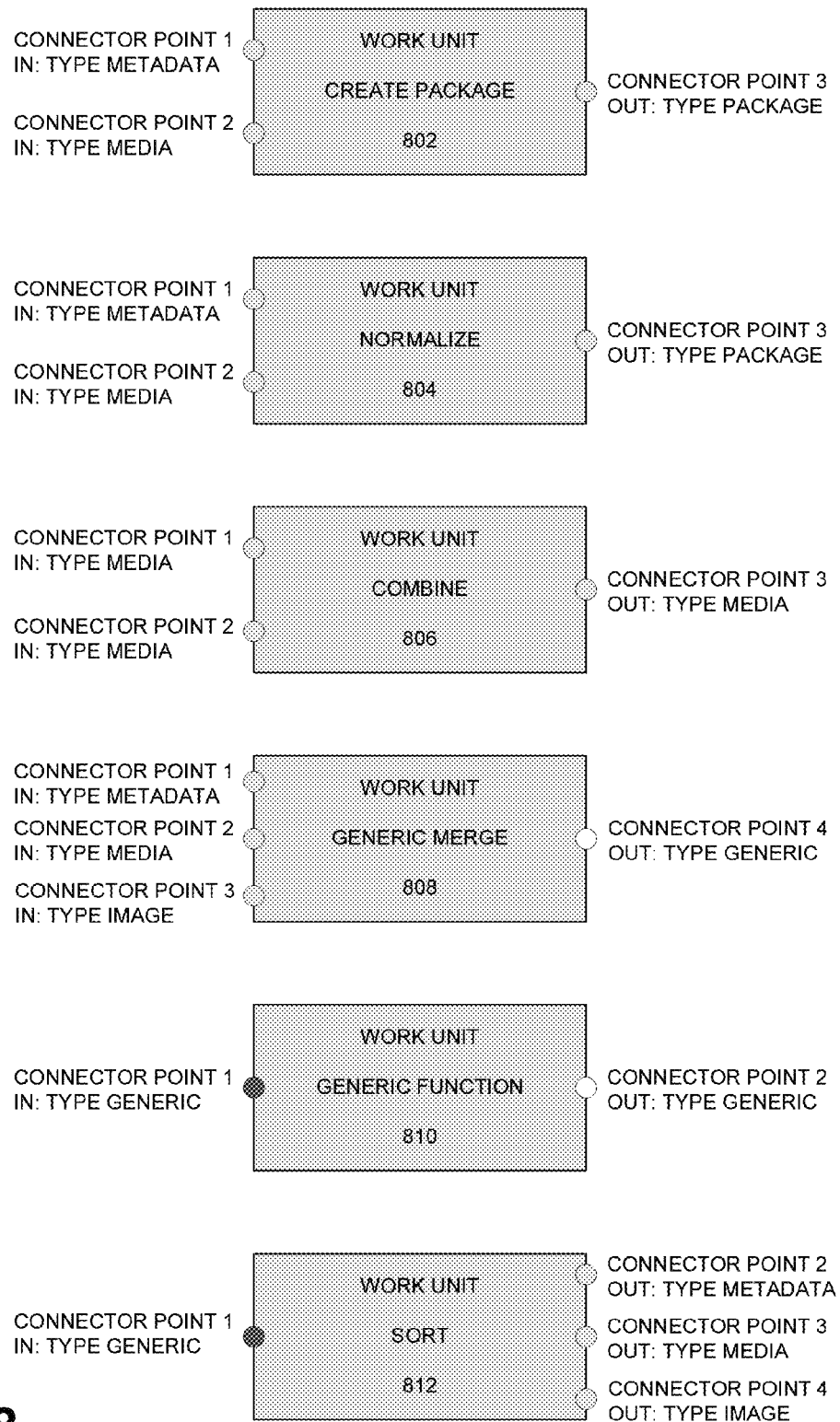
FIG. 8 depicts exemplary work units with different types of connector points.

FIG. 8 depicts exemplary work units with different types of connector points/ports. Work unit 802 may generate a package to be delivered to a DMR. The term "package," as used herein, may refer to media content (e.g., video, audio, multimedia, etc.) with additional data (e.g., metadata—data that describes the media content). As indicated by connector points 1, 2, and 3, work unit 802 may receive the metadata and media content as input and may output a package by combining the metadata and the media content.

Work unit 804 is similar to work unit 802, except that work unit 804 standardizes ("normalizes") the input metadata and combines the normalized metadata with input media to create a package. Work unit 806 combines two input media streams to generate a new media stream. Depending on the implementation, work unit 806 may insert the first input media stream into the second input media stream, or, alternatively, splice segments of the input media streams in a round robin or interleaved fashion.

Work unit 808 may merge different types of input (e.g., metadata, media, and image) and may combine them to produce one of multiple types of output. For example, when metadata and media are input, work unit 808 may output a package. However, when metadata and image data are input, work unit 808 may output a specific type of formatted image file. Because output of work unit 808 can vary depending on its inputs, the connector point 4 is of generic type (e.g., the output can be of any type).

Work unit 810 may receive any type of input, apply an operation, and produce any type of output. For example, in one implementation, work unit 810 may receive data, generate a duplicate of the data, concatenate the duplicate with the original, and output the concatenated data.

Work unit 812 may receive data that is a combination of image, media, and metadata. Work unit 812 may sort the content as image, media, and/or metadata, and output the sorted contents.

Although not shown in FIG. 8, a work unit may have other types of connector points, depending on its function and implementation. For example, a work unit may have only output ports or only input ports. In another configuration, a work unit may include an error connector point. The error connector point may be attached to an error handling work unit. In some implementations of DDC 150, all work units may include an error connector point.

FIG. 9 is a list of exemplary operations that may be performed on a work unit via configuration manager 502 and/or workflow manager 504. As shown, configuration manager 502/workflow manager 504 may support installing a work unit 902, changing a work unit state 904, getting a list of work units 906, getting a work unit 908, getting work unit parameters 910, updating work unit parameters 912, retrofitting an active work unit 914, and retrofitting a single work unit 916. Configuration manager 502/workflow manager 504 may provide additional operations (e.g., work unit editing operations), but for simplicity, they are not illustrated in FIG. 9. In other implementations, configuration manager 502/workflow manager 504 may provide for additional, fewer, or different operations than those illustrated in FIG. 9.

Installing a work unit 902 may include placing a work unit definition in databases 210 in DDC 150. Changing work unit state 904 may inclue changing a status of a work unit. For example, assume that a status of a work unit is "new." A DDC operator may change the status to one of "testing," "tested," "active," or "inactive."

Getting work unit list 906 may include obtaining a list of all work units, in DDC 150, whose state matches a particular value (e.g., "new," "testing," "tested," "active," or "inactive"). Getting a work unit 908 may include obtaining information about a work unit having a particular identifier (e.g., work unit ID) and a version number. The information may include parameters (e.g., a number, string, Boolean, etc.) that are required to specify the functionality of the work unit. Getting work unit parameters 910 may include obtaining a list of parameters of a work unit, given a particular work unit ID and work unit version. Updating work unit parameters 912 may include storing modified parameters of a work unit in databases 210.

Retrofitting an active work unit 914 may include updating all workflows in databases 210 with the current, "active," version of a work unit. Retrofitting a single work unit 916 may include updating a particular version of a work unit within a workflow defined in databases 210 of DDC 150.

Figure 10:
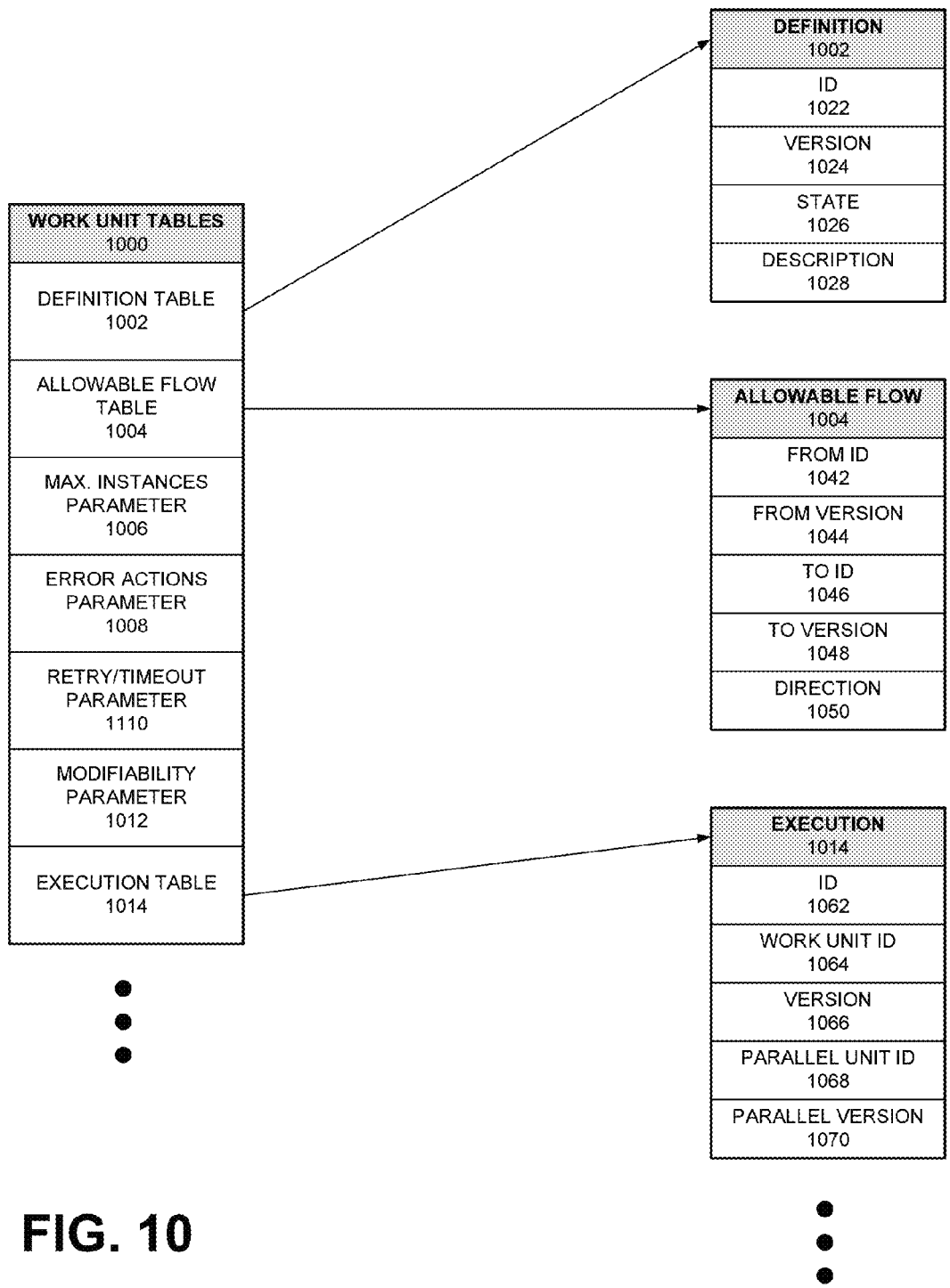
FIG. 10 illustrates exemplary tables and parameters, in the DDC of FIG. 2, that are related to a work unit.

FIG. 10 illustrates exemplary tables and parameters that are related to a work unit. When a work unit or other related components (e.g., workflow, a connector, work order, etc.) are created, configuration manager 502 and/or other SOM modules 244 may update or generate such tables and parameters, in databases 210 or memory, that characterize and track the work unit and the other components. The diagram in FIG. 10 shows the relationship between the tables, as well as parameters that pertain to the work unit.

As shown, work unit related tables 1000 may include a work unit definition table 1002, allowable flow table 1004, maximum instances parameter 1006, error actions parameter 1008, retry/timeout parameter 1010, modifiability parameter 1012, and execution table 1014. Although DDC 150 may include other work unit-related tables or parameters, for simplicity, they are not illustrated in FIG. 10. Additionally, in other implementations, DDC 150 may include additional, fewer, different, or differently arranged tables than those illustrated in FIG. 10. For example, in one implementation, work unit definition table 1002 may include information included in allowable flow table 1004.

Definition table 1002 may include a work unit ID 1022, version number 1024, state 1026, and description 1028. Work unit ID 1022 may identify a type of work unit. Version number 1024 may identify a version of the type of work unit. Work unit ID 1022 and version number 1024 may be generated and/or assigned to a work unit when the work unit is created, for the purpose of identifying the work unit. State 1026 may indicate a current state of the work unit (e.g., "new," "active," "inactive," "testing," "tested," etc.). Description 1028 may include a description, in text, of the functionality of the work unit.

Allowable flow table 1004 may indicate whether two work units may be interconnected, and may include a From ID 1042, From version 1044, To ID 1046, To version 1048, and direction 1050. From ID 1042 and From version 1044 may indicate a work unit ID and a version of one of the two work units. To ID 1046 and to version 1048 may indicate a work unit id and version of the other of the two work units. Direction 1050 may indicate the direction in which data is to flow between the two work units (e.g., forward, reverse, etc.).

Work execution table 1014 may include runtime information used for execution of a work unit. During an execution of logic (e.g., program, scripts, etc.) associated with a work unit, DDC 150 may create an instance of execution table 1014 corresponding to the work unit, to control and/or track the progress of the execution. Accordingly, execution table 1014 may include a work unit execution ID 1062, work unit ID 1064, work unit version 1066, parallel unit ID 1068, and parallel version 1070. For simplicity, other entries in work execution table 1014 are not illustrated (e.g., additional parallel IDs and parallel versions).

Work execution ID 1062 may identify a process (e.g., a runtime instance of a program or a script) or thread associated with the work unit. Work unit ID 1064 and version 1066 may identify the work unit and the work unit version associated with the process/thread. Parallel unit ID 1068 and version 1070 may identify a version of a work unit that may be executed in parallel with the work unit identified by fields 1064 and 1066.

FIG. 11 is a list 1100 of different types of work units. Within DDC 150, the work unit types in list 1100 may be part of a library, from which individual work units may be selected for assembling a workflow. As shown, list 1100 includes a create metadata work unit 1102, transform metadata work unit 1104, pull metadata work unit 1106, pull media work unit 1108, confirm delivery work unit 1110, encode work unit 1112, decode work unit 1114, advertisement marker work unit 1116, close captioning work unit 1118, branch work unit 1120, merge work unit 1122, transcode work unit 1124, split media work unit 1126, distribute work unit 1128, package work unit 1130, encrypt work unit 1132, decrypt work unit 1134, archive work unit 1136, save work unit 1138, retrieve work unit 1140, quality assurance work unit 1142, manual intervention work unit 1144, report work unit 1146, and assembly work unit 1148. Although each of work units 1102-1148 is described below as performing one or more operations, the actual operations are performed via a corresponding work unit process instantiated based on the particular work unit during runtime. Depending on the setting, configuration, version, implementation etc., DDC 150 may provide for additional or different work units than those in list 1100.

Each of work units 1102-1148 may serve one or more business logic/rules associated with content acquisition, transformation and distribution. For example, work units 1102-1108 and 1132-1146 may serve the business logic associated with ingesting asset/content from a content provider; work units 1104, 1112-1126, and 1136-1146 may serve the business logic associated with asset/content transformation; work units 1110, 1128-1134, 1138-1146 may serve the business logic associated with distribution of asset/content, and work unit 1148 may serve the business logic associated with activities prior to ingesting assets.

Create metadata work unit 1102 may receive an asset (e.g., media content) and a length/size of the asset and generate corresponding metadata when the asset does not include metadata. Transform metadata 1104 may receive metadata in one format and convert the metadata in accordance with a different standard or format (e.g., translate between different metadata standards or formats). In some implementations, DDC 150 may also include related work units, such as a work unit for normalizing metadata (e.g., changing metadata format into a standard one). Such a work unit may assign an identifier for each metadata type, as well as a different metadata version number.

Pull metadata work unit 1106 may obtain metadata associated with assets (e.g., download the assets) from a source via, for example, a SFTP client/server application, Aspera fasp™, Windows™ Common Internet File System (CIFS), hypertext transfer protocol (HTTP), etc. Pull media work unit 1108 may obtain assets from a source. Confirm delivery work unit 1110 may generate and send a message to, for example, a DDC operator, process, customer, etc., upon successfully delivering an asset to an end point (e.g., DMR 130).

Pull work units 1106 and 1108 may pull asset/content/metadata at the earliest start time based on customer order information. During runtime, processes corresponding to pull work units 1106 and 1108 may track what has been pulled as well as the pulling rate required to meet a jeopardy time (e.g., a threshold) for "ingesting" content (i.e., obtaining and storing the asset in DDC 150 according to a set of criteria, such as standardizing metadata received along with the asset). If the pulling rate is below a target rate, work units 1106 and 1108 may generate an alarm.

In some implementations, DDC 150 may also include push work units. To receive contents/assets that are pushed from content creators/providers 110, DDC 150 may provide a staging area with demilitarized zone (DMZ) architecture. Similar to pull work units 1106 and 1108, the push work units may track what has been pushed as well as the rate of pushing required to meet a jeopardy time, and generate an alarm if the rate is below a target rate. Both the pull and push work units may be capable of receiving live media streams from a source.

Encode work unit 1112 may transform an asset from one format to another format. In transforming the asset, during runtime, encode work unit 1112 may invoke a work unit adapter that performs the actual encoding. Decode work unit 1114 may obtain an original asset from encoded data. In obtaining the original asset, decode work unit 1114 may invoke a work unit adapter that accesses a network element to perform the actual decoding. The decoded data may or may not have been encoded by encode work unit 1112.

Ad marker work unit 1116 may insert advertisement breaks in a media/content. The inserted breaks may include, for example, digital cue tones that are undetectable by viewers, digital program insertion (DPI) markers, etc. Ad marker work unit 1116 may engage engines for generating ad points (e.g., points at which ad breaks may be inserted). Such engines may operate automatically or with user assistance.

Close captioning work unit 1118 may overlay a transcript of audio on an asset. Branch work unit 1120 may send copies of metadata of an asset to multiple work units. Merge work unit 1122 may merge metadata received from multiple work units. Merge work unit 1122 may merge the multiple metadata, for example, when multiple assets are being combined (e.g., concatenated, spliced, etc.).

Transcode work unit 1124 may change the format of an asset (e.g., change frame rate, aspect ratio, resolution, crop, etc.). Transcoding may be efficiently performed when the source and target formats are sufficiently similar. In transcoding, work unit 1124 may use parameters such as, for example: names of source and target files; video frame size; bit rate; frame rate; identity of video codec; audio bit rate; audio sample rate; audio codec; etc. One example of transcoding may include changing a format of an asset originally received in an MP2 format to an AVI format.

Split media work unit 1126 may split a media stream/file into multiple streams/files. For example, split media work unit 1126 may split a media file into audio, video, and subtitles and send each to a corresponding decoder. In one implementation, split media work unit 1126 may not itself perform decoding, but stream segregated components of the file/stream to their respective decoders. In other implementations, split media work unit 1126 may split a media stream by segmenting the media stream based on either size or time (e.g., split an hour-long video into two 30 minute videos).

Distribute work unit 1128 may distribute an asset to one or more DMRs and other types of customers. In distributing assets to a particular DMR 130 or consumer 140, distribute work unit 1128 may attach, to the assets, metadata that is specified by content creator 110, DMR 130, or consumer 140. This may require the metadata of the asset to be mapped to the metadata format requested/needed by DMR 130 or consumer 140.

Distribute work unit 1128 may distribute the asset to multiple DMRs concurrently or in sequence, depending on system resource availability and a work order specification. If a network connection with DMR 130 cannot be established, distribute work unit 1128 may re-attempt to distribute to DMR 130 at a later time. Each successive attempt may trigger a wait period that exponentially increases with each trial (e.g., 1 minute, 2 minutes, 4, minutes, 8 minutes, 16 minutes, etc.). When distribute work unit 1128 has tried a particular number of times, distribute work unit 1128 may send an alarm to a DDC operator, indicating that the DMR is off-line. When the DDC operator toggles the state of DMR 130 as being on-line, distribute work unit 1128 may retry all failed distributions. This may or may not result in rescheduling processes (e.g., other distributions) waiting on availability of resources (e.g., bandwidth) allocated for the distribution.

Package work unit 1130 may assemble interrelated assets and data, including content, metadata, artwork, etc., into a single package for distribution. During packaging, package work unit 1130 may require, use, and/or output parameters such as, for example, a name of asset, an asset location (e.g., a network address or a universal resource locator (URL), etc.), a package ID, a package version, a name of metadata, a location of the metadata, etc.

In some instances, for distribution, it is convenient to bundle packages that are generated by package work unit 1130. For such cases, in some implementations, DDC 150 may include a bundling work unit, for combining a list of packages.

Encrypt work unit 1132 may encode data, via an algorithm that renders the recovery of the original data from the encoded data difficult, without using one or more keys. The encryption may secure the original data against unauthorized use. Decrypt work unit 1134 may decode encrypted data, via one or more keys, to recover the original data from which the encrypted data has been obtained. Both encrypt and decrypt work units 1132 and 1134 may allow a user to select a particular encryption/decryption profile (e.g., algorithm or parameter) from available alternatives. In some implementations, the encryption/decryption scheme may generate a root key for a chain of licenses.

Archive work unit 1136 may store data in a long-term repository. In archiving, work unit 1136 may require and/or use parameters such as, for example, an identifier associated with data being archived (e.g., name of an asset, metadata type, etc.), user ID of a user requesting the archive operation, password, etc. Save work unit 1138 may temporarily store an asset during its processing. The stored asset may be removed when the processing is complete or may be made permanent. Save work unit 1138 may require and/or use parameters such as, for example, a name of the asset/metadata being processed, a network address of the asset/metadata, a user ID, a password, etc. Retrieve work unit 1140 may retrieve stored data/asset from a particular location in a network, based on the name and location of data/asset, etc.

Quality assurance work unit 1142 may check the quality of processed data/asset, to ensure that the processed data/asset meets source (e.g., content creator 110) and target (e.g., DMR 130) requirements. For example, quality assurance work unit 1142 may determine whether processed data/asset has been transcoded correctly and free of corruption. In another example, quality assurance work unit 1142 may check the quality of assets/content received from a source (e.g., file size, checksum, etc.). In some implementations, in addition to quality assurance work unit 1142, DDC 150 may also provide a metadata quality assurance work unit that checks for presence of particular fields, allowed values in the fields, titles, asset ID, etc.

Manual intervention work unit 1144 may assign (based on input from a manager or another user) work to human workers. In assigning the work, manual intervention work unit 1144 may send messages to the workers. Report work unit 1146 may send different types of reports to users (e.g., emails, notifications, etc.).

Assembly work unit 1148 may assemble data for generating a work order. The data may include customer-provided profiles for downloading an asset, a workflow, generic work order instructions, bill of materials (e.g., a specification setting forth a set of inputs and outputs necessary to execute a work order), etc.

Depending on the implementation, DDC 150 may provide other types of work units not in list 1100. For example, DDC 150 may include a work unit for transcoding ingested assets into a low-resolution proxy asset. For this operation, the required parameters may include, for example, a video frame size, bit rate (e.g., 1024 k), frame rate, video codec, etc. In another example, DDC 150 may include image/art work transformer work unit for changing a resolution, black filling, etc., and/or rendering other types of modifications to the image/artwork.

Additional examples of the other types of work units include work units for publication of content, allowing manual handling of metadata and/or content, adapting ad markers, transforming artwork and images, allowing manual assembly, allowing manual packaging, checking time code, bundling packages, audio leveling, layering content, and concatenating content.

Figure 12:
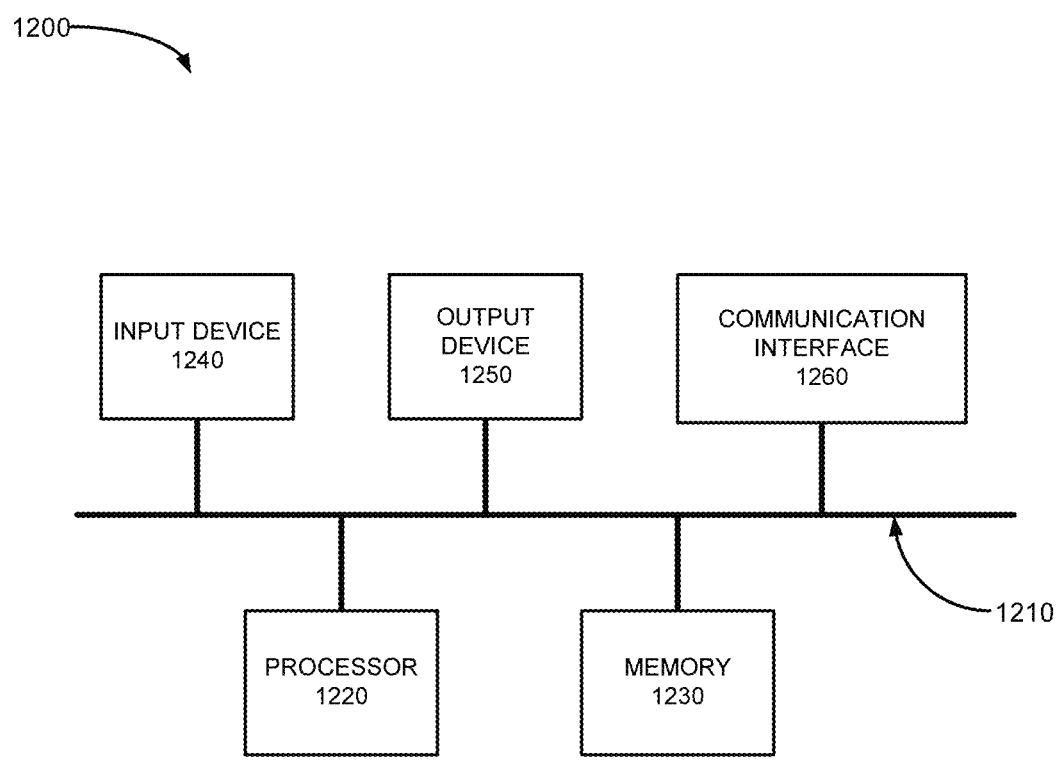
FIG. 12 is a block diagram of an exemplary network device of FIG. 4.

FIG. 12 is a block diagram of an exemplary network device 1200. Network device 1200 may correspond to one or more of devices 402 through 408, which may be used to implement, for example, components illustrated in FIG. 2. Referring to FIG. 12, network device 1200 may include bus 1210, processor 1220, memory 1230, input device 1240, output device 1250 and communication interface 1260. Bus 1210 may include a path that permits communication among the elements of network device 1200.

Processor 1220 may include one or more processors, microprocessors, or processing logic that may interpret and execute instructions. Memory 1230 may include a random access memory (RAM) or another type of dynamic storage device that may store information and instructions for execution by processor 1220. Memory 1230 may also include a read only memory (ROM) device or another type of static storage device that may store static information and instructions for use by processor 1220. Memory 1230 may further include a storage device, such as a solid state drive (SDD), a magnetic and/or optical recording medium (e.g., a hard disk), etc. Depending on the context, the term "memory," "storage," "storage device," and/or "storage unit" may be used interchangeably. For example, a "computer-readable storage device" may refer to both a memory and/or storage device.

Input device 1240 may permit a user to input information to network device 1200, such as a keyboard, a keypad, a mouse, a pen, a microphone, a touch screen, voice recognition and/or biometric mechanisms, etc. Output device 1250 may include a mechanism that outputs information to the user, including a display, a printer, a speaker, etc. In some implementations, because network device 1200 may operate as a server device, network device 1200 may include minimal number of input device 1240 and output device 1250 (e.g., a keyboard and/or a console), to minimize cost and to increase robustness.

Communication interface 1260 may include a transceiver (e.g., a transmitter or receiver) for network device 1200 to communicate with other devices and/or systems. For example, via communication interface 1260, network device 1200 may communicate over a network, such as the Internet, an intranet, a terrestrial wireless network (e.g., a WLAN, WiFi, WiMax, etc.), a satellite-based network, optical network, etc. Communication interface 1260 may also include a modem, an Ethernet interface to a LAN, and/or another interface.

In the foregoing description, DDC 150 may allow a user to define work units and use the work units for composing workflows, to dynamically provide for customer-requested processes for content distribution. When the user submits an order on behalf of a customer, the DDC may obtain, from the workflow associated with the order, tasks that correspond to the work units. Furthermore, the DDC may perform each of the tasks.

The foregoing description of implementations provides illustration, but is not intended to be exhaustive or to limit the implementations to the precise form disclosed. Modifications and variations are possible in light of the above teachings or may be acquired from practice of the teachings.

For example, while series of blocks have been described with regard to an exemplary process illustrated in FIG. 6, the order of the blocks may be modified in other implementations. In addition, non-dependent blocks may represent acts that can be performed in parallel to other blocks. Furthermore, process 600 may include additional, fewer, or different blocks than those illustrated in FIG. 6.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

No element, act, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A system comprising:
    a configuration manager configured to:
        create work units, each of the work units including:
            at least one of an input port and an output port, and
            a logic component that modifies data received via the input port, wherein the logic component of one or more of the work units is configured to transcode media content for output via the output port, and
        compose a workflow by connecting the output port of the one or more work units to the input port of another one of the work units;
    work order components configured to:
        receive a work order with which the workflow is associated,
        decompose the workflow into constituent work units,
        create tasks that correspond to the constituent work units, and
        assign a set of parameters to the tasks, wherein a first parameter is configured to include an unchangeable system value, a second parameter is configured to include a changeable default value, a third parameter is configured to include a default value requiring user verification, and a fourth parameter is configured to include a value requiring user entry; and
    a command processor configured to execute, based on the assigned parameters for each task, a corresponding work unit process.

2. The system of claim 1, further comprising:
    an application server including at least one of the configuration manager, work order components, or the command processor.

3. The system of claim 1, wherein the configuration manager includes a component for creating work units.

4. The system of claim 1, wherein the logic component includes at least one of:
    logic for distributing media content to a consumer or a digital media retailer;
    logic for ingesting media content; or
    logic for transforming ingested media content.

5. The system of claim 1, wherein the work order components are further configured to:
    create a connector corresponding to an interconnection between the output port of the one or more work units and the input port of the other work unit, the connector including a database record for storing output of a work unit process corresponding to the one or more work units.

6. The system of claim 1, wherein the configuration manager is further configured to:
    receive one of a chain of method calls initiated from an input via a remote client, the one of the chain of method calls requesting creation of the work units.

7. The system of claim 1, wherein the work units further includes at least one of:
    a work unit identifier;
    a work unit version; or
    a state that includes one of: new, testing, tested, active, or inactive state.

8. The system of claim 1, further comprising:
    a database including at least one of:
        data identifying work units that can be executed in parallel to the one or more work units; or
        data identifying allowable flow of data between different ones of the work units.

9. The system of claim 1, wherein the input port of the other work unit is configured to at least one of:
    receive any type of data;
    receive media content; or
    receive metadata.

10. The system of claim 1, further comprising:
    databases for storing data from the configuration manager, the work order components, and the command processor, wherein the configuration manager is further configured to:
        install a work unit in the databases;
        change a work unit state;
        obtain a list of work units matching a particular state; or
        update the parameters of a work unit.

11. The system of claim 1, wherein the work units include at least one work unit configured to:
    create metadata for received content when the content does not include metadata;
    transform metadata associated with an asset received by the at least one work unit;
    pull metadata from a source; or
    pull media content from a source.

12. The system of claim 1, wherein the work units include at least one work unit configured to:
    insert an advertisement marker in media content;
    provide close captioning in media content;
    merge two or more media streams; or
    split a media stream into multiple media streams.

13. The system of claim 1, wherein the work units include at least one work unit configured to:
    distribute the transcoded media content;
    package the transcoded media content; or
    archive the transcoded media content.

14. A method comprising:
    creating work units including at least one of an input port and output port, wherein each work unit is configured to modify data received via the input port, wherein at least one of the work units is configured to transcode the data for output via the output port;
    composing a workflow by connecting output port of one or more of the work units to the input port of another one of the work units;
    receiving a work order;
    selecting the workflow in response to the work order;
    decomposing the workflow into constituent work units;
    instantiating tasks that correspond to the constituent work units;
    configure a set of parameters for the tasks, wherein a first parameter includes an unchangeable system value, a second parameter includes a changeable default value, a third parameter includes a default value requiring user verification, and a fourth parameter includes a value requiring user entry; and executing a work unit process based on the set of parameters.

15. The method of claim 14, further comprising:
reserving space in a database, the space corresponding to an interconnection between the at least one output port of the one or more of the work units and the at least one input port of the other one of the work units.

16. The method of claim 14, further comprising:
receiving remote commands from a client device to:
obtain the parameters of a work unit;
retrofit an active work unit; or
retrofit a single work unit.

17. The method of claim 14, wherein executing the work unit process includes at least one of:
encoding media content;
decoding encoded media content;
encrypting media content; or
decrypting encrypted media content.

18. The method of claim 14, wherein executing the work unit process includes at least one of:
saving intermediate results of processing media content to a temporary storage;
performing quality assurance check on media content; or
sending a report.

19. A non-transitory computer-readable storage device, comprising computer-executable instructions for execution by at least one processor, the instructions causing the at least one processor to:

construct work units including at least one of an input port or output port, wherein each work unit including an input port is configured to modify data received by the input port, wherein at least one of the work units is configured to transcode the received data;

create a workflow by connecting the output port of one or more of the work units to the input port of another one of the work units;

receive a work order;

select, based on the work order, the workflow from among a plurality of workflows stored in a database;

decompose the workflow into different ones of the work units, generate tasks that correspond to the different ones of the work units;

determine a set of parameters for the tasks, wherein a first parameter includes an unchangeable system value, a second parameter includes a changeable default value, a third parameter includes a default value requiring user verification, and a fourth parameter includes a value requiring user entry; and execute a work unit process based on the set of parameters.

20. The non-transitory computer-readable storage device of claim 19, wherein executing the work unit process causes the at least one processor to concurrently distribute media content to multiple targets or distribute the media content to the multiple targets in sequence.

* * * * *